United States Patent [19]

Bosenberg et al.

[11] Patent Number: 5,033,057
[45] Date of Patent: Jul. 16, 1991

[54] PUMP STEERING MIRROR CAVITY

[75] Inventors: Walter R. Bosenberg, Ithaca, N.Y.; Lap K. Cheng, Newark, Del.; Chung L. Tang, Ithaca, N.Y.

[73] Assignee: Cornell Research Foundation, Inc., Ithaca, N.Y.

[21] Appl. No.: 455,179

[22] Filed: Dec. 22, 1989

[51] Int. Cl.$^5$ ............................................... H01S 3/093
[52] U.S. Cl. ........................................ 372/72; 372/97; 372/99; 372/21; 307/425; 307/428
[58] Field of Search .................. 307/425, 428; 372/20, 372/21, 71, 70, 97, 99, 92, 72

[56] References Cited

U.S. PATENT DOCUMENTS

| | | | |
|---|---|---|---|
| 3,454,902 | 7/1969 | Giordmaine | 307/428 |
| 4,085,335 | 11/1978 | Guilino | 307/425 |
| 4,189,652 | 2/1980 | Levinos et al. | 307/428 |
| 4,876,688 | 10/1989 | Wang et al. | 372/21 |

OTHER PUBLICATIONS

"Beta-Barium Borate Optical Parametric Oscillator" Komine, CLEO '88 pp. 529-530.
"Synchronously Pumped Optical Parametric Oscillator Using Beta-Barium Borate", Bromley, CLEO '88/Monday Morning/32.
"High Power Bab$_2$O$_4$ Visible Optical Parametric Oscillator Pumped by Single-Axial-Mode 355-nm Pulses", Fan CLEO '88, pp. 527, 528.
"Barium Borate Optical Parametric Oscillator", Fan, IEEE Journal of Quantum Electronics, vol. 25, No. 6, Jun. 1989, pp. 1196-1199.
"Optical Parametric Oscillation in a Beta-Barium Borate Crystal Pumped by an XeCl Excimer Laser", Komine, Opticals Letters, vol. 13, No. 8, Aug. 1988, pp. 643, 645.
"Visible Bab$_2$O$_4$ Optical Parametric Oscillator Pumped at 355 nm by a Single-Axial-Mode Pulsed Source"]- Fan, Appl. Phys. Lett. 53 (21), Nov. 21, 1988, p. 2014.
"Synchronously Pumped Optical Parametric Oscillation in Beta-Barium Borate", Bromley Optics Communications, vol. 67, No. 4, Jul. 15, 1988, pp. 316-320.

Primary Examiner—Frank Gonzalez
Assistant Examiner—Susan S. Morse
Attorney, Agent, or Firm—Jones, Tullar & Cooper

[57] ABSTRACT

An optical parametric oscillator capable of operating in the 0.300 to 0.400 micrometer wavelength range is disclosed. The oscillator includes a cavity defined at its ends by a pair of cavity resonator mirrors. A nonlinear optical crystal is positioned on the optical axis of the cavity intermediate the mirrors and is rotatable about a crystalline axis to tune the oscillator. A pair of pump steering mirrors are mounted in the cavity, one mirror between each resonator mirror and the corresponding end of the crystal. A source of pumping energy supplies energetic light to the cavity, the pumping beam being directed into the cavity and onto a first steering mirror, thence through the crystal and to the second steering mirror which then directs the pumping beam out of the cavity. The pumping beam may be at a wavelength of 266 nm, for example, to produce an output wave from the oscillator within the range of interest.

15 Claims, 3 Drawing Sheets

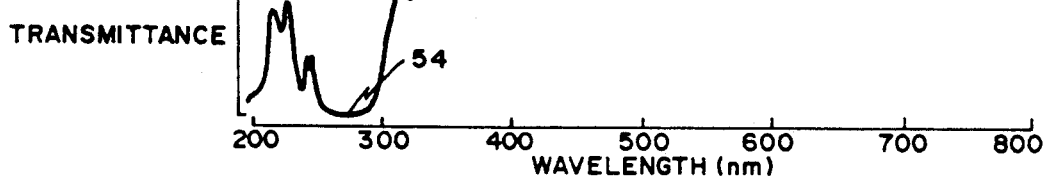
FIG. 2A TRANSMITTANCE
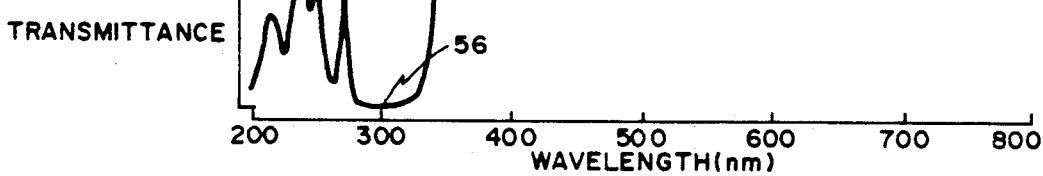
FIG. 2B TRANSMITTANCE
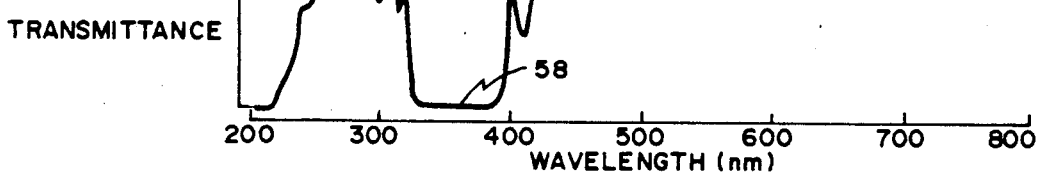
FIG. 2C TRANSMITTANCE
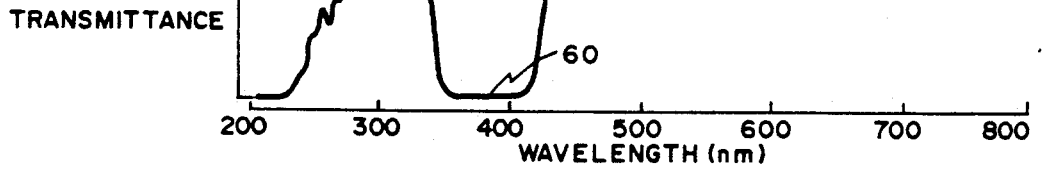
FIG. 2D TRANSMITTANCE
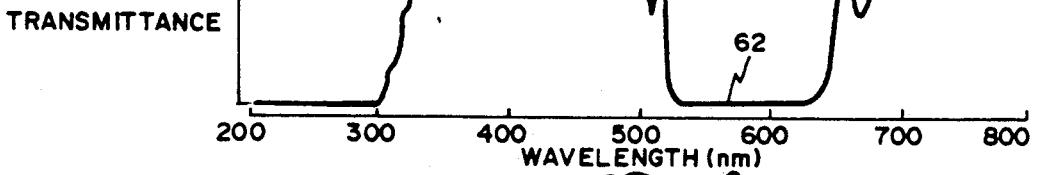
FIG. 2E TRANSMITTANCE
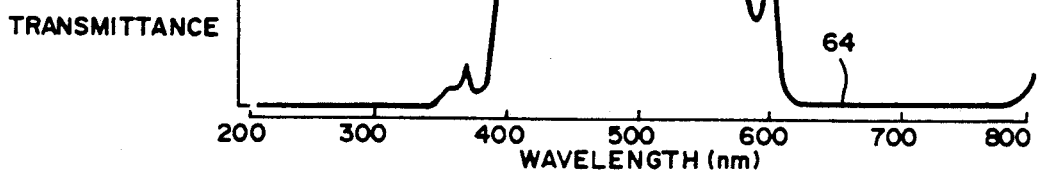
FIG. 2F TRANSMITTANCE

PUMP STEERING MIRROR CAVITY

BACKGROUND OF THE INVENTOR

This invention was made with Government support under Grant No. N00014-89-K-2017 awarded by the Naval Research Laboratory, and under Grant No. EET-8814647 awarded by the National Science Foundation. The Government has certain rights in the invention.

The present invention relates, in general, to singly resonant optical parametric oscillators (OPO), and more particularly to continuously tunable, high power OPOs incorporating a pair of pump steering mirrors for introducing a pumping input signal into the oscillator cavity and for directing the pumping signal out of the cavity.

The optical parametric oscillator has long been known as a high power, broadly tunable source of coherent radiation. In the past, however, the development of the OPO has been hampered by a scarcity of nonlinear optical materials possessing suitable optical and mechanical characteristics, low-temperature phase barium metaborate ($\beta$-BaB$_2$O$_4$), a recently developed nonlinear optical material with excellent deep ultraviolet transparency, has created a resurgence of interest in the OPO. For example, beta barium metaborate (BBO) optical parametric oscillators pumped at 308 nm and 355 nm have been reported to generate light at wavelengths from 0.422 to 1.68 micrometers.

U.S. Pat. application Ser. No. 07/373,064, filed June 26, 1989 now abandoned and assigned to the assignee of the present application discloses the use of beta barium metaborate crystals in frequency conversion applications, while U.S. Pat. application Ser. No. 07/379,781 of L. K. Cheng et al, filed on July 14, 1989 still pending and also assigned to the assignee of the present application, describes the use of such crystals in optical parametric oscillators which are tunable in the visible and near infrared. Both application Ser. No. 07/373,064 and application Ser. No. 07/379,781 are hereby incorporated herein by reference.

The use of a BBO crystal in an optical parametric oscillator is particularly attractive because such crystals have a broad transparency, a large optical nonlinearity, large birefringence, and a high fracture temperature. Furthermore, BBO crystals have a high optical damage threshold, and thus are capable of handling relatively high optical power. However, the mirrors used to define the cavity in an optical parametric oscillator must meet stringent requirements, and with the use of a BBO crystal, the mirrors become the limiting factor in the available power level. Thus, if an OPO is pumped by an input beam having a wavelength of 226 nm, severe demands are placed on conventional linear cavity OPO mirrors, particularly if a broad tuning range is to be achieved.

Conventional, singly resonant oscillator mirrors are required to be highly transmissive at the pump wavelength, highly transmissive at the idler wavelengths, and highly reflective at the signal wavelengths. In the alternative, the responses to the signal and idler branches may be interchanged. In addition, these mirrors must have high damage thresholds at these three wavelengths. In order to achieve the desired reflective and transmissive characteristics, custom trichroic mirrors are generally required, especially when the pump wavelength is in the ultraviolet. For applications where the device needs to be broadly tunable, either broadband mirrors or large numbers of narrow bandwidth mirrors are required. Since broadband dielectric reflective coatings require many stacks on a substrate, they tend to be quite thick, particularly for broadband infrared high reflectors since each coating layer is one-quarter wavelength thick. Thick coatings tend to be mechanically weak and are far less resistant to optical damage. Furthermore, since ultraviolet signals are very energetic short waves, such thick coatings present serious difficulties in broadband oscillators and severely limit their operation. Thus, a compromise must be made in conventional systems between damage threshold and the number of mirrors used to cover the tuning range of an OPO.

An additional problem is that any dielectric mirror which efficiently reflects a given wavelength must also reflect its odd harmonics as well, since all of these wavelengths interfere constructively in the oscillator cavity. This implies that certain wavelengths cannot be resonated in the cavity without seriously compromising the transmission at the pump wavelength. For a pump signal of 266 nm, for example, wavelengths of 0.798 and 1.33 micrometers cannot be resonated. Thus, the flexibility and tunability of an optical parametric oscillator is severely compromised by conventional cavity designs. These problems have made it particularly difficult to produce light in the 0.300–0.400 micrometer range.

SUMMARY OF THE INVENTION

The present invention overcomes the problems associated with conventional cavity designs by providing two separate pairs of mirrors in the cavity, thereby simplifying the construction of the mirrors while providing an oscillator which operates reliably in the ultraviolet, visible and near infrared wavelength regions. In particular, an oscillator which is tunable in the difficult range of 0.300–0.400 micrometer range is provided. This improved operation is obtained with standard, commercially available mirrors, thereby reducing the cost of the mirrors by about an order of magnitude.

In accordance with the present invention, a broadly tunable optical parametric oscillator is constructed utilizing a rotatable nonlinear crystal mounted in a cavity, the ends of the cavity being defined by a pair of spaced OPO resonator mirrors having parallel facing reflective surfaces aligned on the axis of the cavity. In order to free the cavity mirrors from the requirement of transmitting the intense pump beam, a pair of pump steering mirrors are mounted in the cavity between the crystal and the respective cavity end mirrors and are set at Brewster's angle with respect to the cavity axis. These pump steering mirrors are standard, commercially available 45° incidence high reflectors (in excess of 98%) for the pumping wavelength, which may be 266 nm, for example. Such a mirror is selected to transmit well at the oscillator wavelengths of interest, particularly at wavelengths longer than 0.30 micrometers and typically up to about 2.2 micrometers. The long wavelength cutoff for a typical mirror is due to absorption by the fused silica substrate on which the mirror coatings are formed.

For type I phase matching in beta barium borate, for example, the extraordinary pump beam is s polarized and directed onto the surface of one of the pump steering mirrors at Brewsters angle. This beam is directed by the mirror along the axis of the cavity through the crystal and to the second pump steering mirror, which directs the pump beam out of the cavity. The ordinary signal and idler beams produced by the nonlinear crystal are p polarized and are transmitted through the two pump steering mirrors to the respective cavity end mirrors, this transmission taking advantage of the high transmission at Brewster's angle of the steering mirrors at the signal and idler wavelengths. The cavity mirrors produce oscillation in the device, with no high power filters being required to separate the OPO output from the pump signal. It will be understood that for Type II phase matching in BBO, when the extraordinary idler beam is resonated, the pump beam is p polarized. Further, the same resonant cavity mirrors can be used for a variety of pump wavelengths, and concave cavity mirrors can be used without affecting the collimation of the pump beam. For a synchronously pumped OPO, the present construction eliminates the need for intracavity pump beam shaping optics. Finally, this construction has the advantage that it facilitates the use of linewidth narrowing elements such as gratings, prisms and etalons in the cavity.

It has been found that the use of pump steering mirrors permits a low oscillation threshold and that high conversion efficiency is possible with proper pump beam parameters and when pump steering optics having a high damage threshold are used.

The oscillator of the present invention is capable of producing parametric oscillation in the 0.300-0.400 micrometer range, a region where other sources of tunable radiation are less efficient and more cumbersome to use. In tests it has been found that the oscillator, when pumped at 266 nm, was continuously tunable over the range of 0.33-1.37 micrometer using a single beta barium metaborate crystal. Furthermore, the OPO device utilizing the cavity design of the present invention was capable of producing radiation throughout the visible and near infrared, while greatly reducing the severe requirements placed upon conventional OPO cavity mirrors.

BRIEF DESCRIPTION OF THE DRAWINGS

The foregoing, and additional objects, features and advantages of the present invention will become apparent to those of skill in the art from the following more detailed description of a preferred form of the invention, taken with the accompanying drawings, in which:

FIGS. 2A-2F are graphical illustrations of the transmittance characteristics of mirrors used in an OPO in accordance with FIG. 1 and pumped at a wavelength of 266 nm.

DESCRIPTION OF PREFERRED EMBODIMENT

Figure 1:
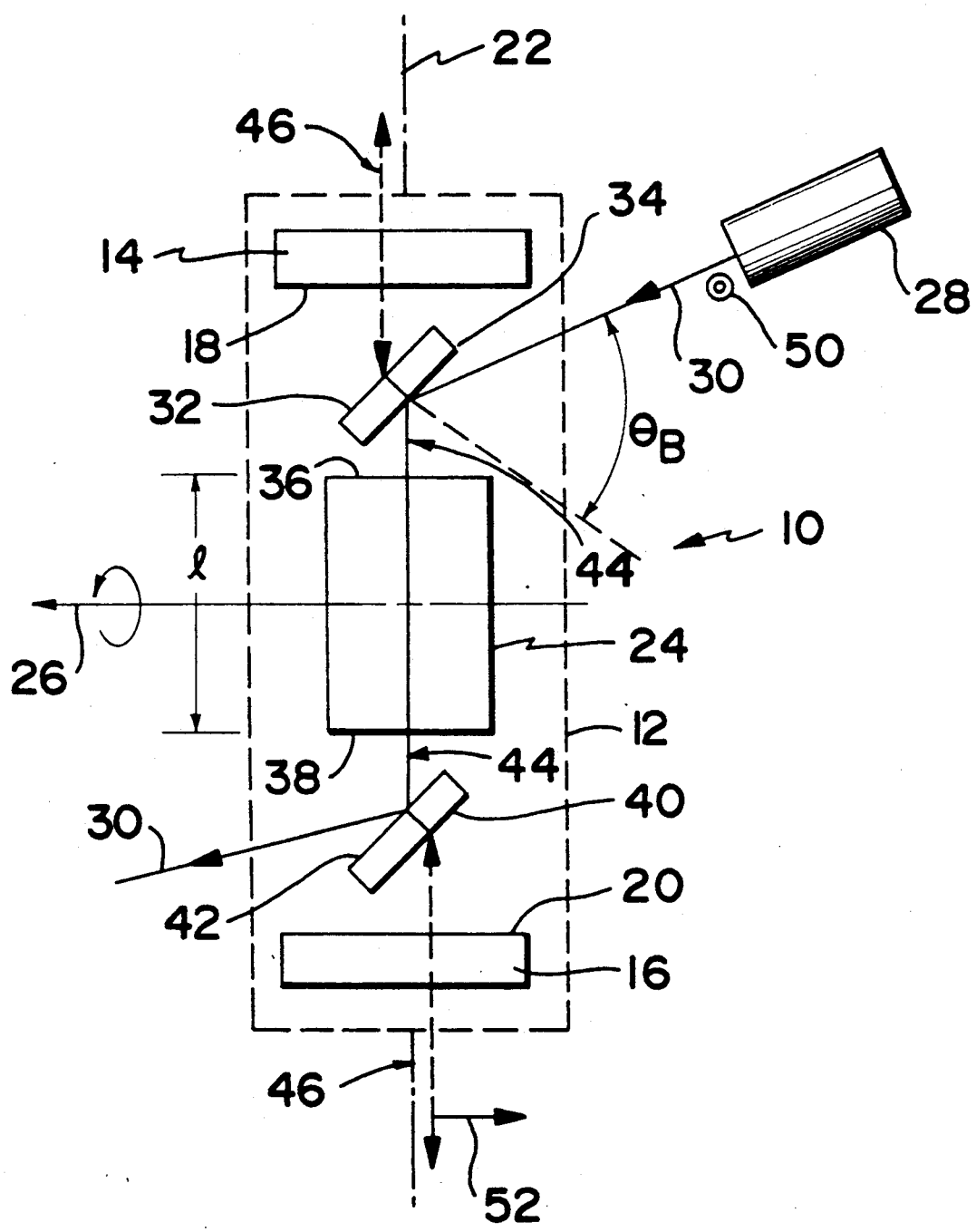
FIG. 1 is a diagrammatic illustration of a broadly tunable, high power optical parametric oscillator in accordance with the present invention.

Turning now to a more detailed description of the present invention, there is illustrated in FIG. 1 an optical parametric oscillator 10 including an optical cavity 12 defined at its opposite ends by a pair of cavity mirrors 14 and 16 having facing reflective parallel or slightly concave surfaces 18 and 20, respectively, in conventional optical parametric oscillator configuration. The mirrors are mounted with their faces perpendicular to the cavity axis 22. Mounted in the cavity 12 between mirrors 14 and 16 and on the axis 22 is a nonlinear optical crystal 24. The crystal is mounted for rotation about its crystallographic x axis 26 to provide tunability for the oscillator.

In a preferred form of the invention, the crystal 24 is a beta barium metaborate ($\beta$-BaB$_2$O$_4$) crystal. In a test of the present invention, the crystal was a type-I OPO crystal at 39.1° with approximately a 12×6 mm$^2$ aperture and an interaction length l of 20.5 mm. The crystal faces were uncoated. Details of the growth and characterization of such crystals are described in the aforesaid U.S. application Ser. No. 07/379,781.

The oscillator 10 is pumped by a source 28, which preferably is a commercially available Q-switched neodymium-doped yttrium aluminum garnet (Nd:YAG) laser. The pumping pulse 30 from source 28 was the fourth harmonic of the laser output, with a diameter of 1.66 mm and a pulse duration of 9 ns.

In accordance with the present invention, the pump beam 30 is directed into the oscillator cavity 12 to a first pump steering mirror 32 at Brewster's angle $\Theta_B$ with respect to the surface 34 of the mirror. Mirror 32 is located in cavity 12 and is set at Brewster's angle with respect to the cavity axis 22, so that the pump beam 30 is directed along axis 22 to the crystal 24. The mirror 32 is a standard, commercially available 45° incidence mirror, with its reflective surface 34 being greater than 98% reflective at the pumping wavelength of 266 nm. In addition, the mirror surface 34 is transmissive at the parametrically generated oscillator output beam wavelengths of interest, in particular at wavelengths longer than 0.30 micrometers. Typically, such a mirror may be transmissive at wavelengths up to about 2.2 micrometers, where the absorption of infrared by the fused silica substrate for the mirror cuts off the transmissivity.

The pump beam 30 is directed by mirror 32 along axis 22 to a first end 36 of crystal 24, passes through the crystal and exits from the second end 38 thereof. The pump beam strikes a second pump steering mirror 40 which is similar to mirror 32, with its face 42 also set at Brewster's angle with respect to the axis 22. The face 42 is highly reflective at the pumping pulse wavelength, and deflects beam 30 out of cavity 12, while being transmissive at the parametrically generated wavelengths of interest.

The pumping beam 30 produces optical parametric luminescence and frequency conversion in crystal 24 at wavelengths which depend upon the rotational angle of the crystal about its axis 26. This luminescence is emitted from the ends 36 and 38 of the crystal 24 along cavity axis 22 as signal and idler beams, generally indicated at 44. These beams are transmitted through the steering mirrors 32 and 40 for reflection from OPO mirrors 14 and 16 back to the crystal to produce parametric oscillation. One or both of the cavity mirrors 14 and 16 may be partially transmissive to provide signal and idler output signals from the cavity, as generally indicated by parametrically generated oscillator output beams 46. These output beams will be at the selected wavelengths of interest, dependent upon the tuning position of the crystal.

Preferably, the extraordinary pump pulse is S polarized, as indicated at 50, so that the ordinary and idler beams 44 will be p polarized, as indicated at 52, to take advantage of the high transmission of steering mirrors 32 and 40 at Brewster's angle.

With the configuration illustrated in FIG. 1, the entire tuning range of the oscillator can be produced with five pairs of inexpensive, commercially available high reflectors serving as the cavity resonator mirrors. The transmission spectra of examples of such mirrors are illustrated as graphs b-f in FIGS. 2B-2F, respectively. Selected pairs of mirrors are used in combination with a pair of pump steering mirrors having the transmission spectrum illustrated in FIG. 2A to provide the complete tuning range of the oscillator. The illustrated spectra are for mirrors used with a 266 nm pumped OPO. The scale on the vertical axis for each individual Figure is from 0% to 100% transmittance, while the horizontal axis is the wavelength of the signal or idler beam in nanometers. The reflectivity peaks illustrated at 54, 56, 58, 60, 62 and 64 in FIGS. 2A-2F, respectively, for the transmissivity curves a-f, for all mirrors are better than 95%. The low transmittance shown in FIGS. 2E and 2F near the short wavelength range (200-300 nm) is due to the ultraviolet absorption of the mirror substrate.

In a test of the present invention, pairs of the mirrors of each of FIGS. 2B, 2C and 2D were used as the cavity mirrors 14 and 16, and each pair was found to satisfy the conditions for singly resonant oscillation of the signal branch of beam 44 to produce the indicated output wavelength. The mirror of FIG. 2F satisfied the conditions for singly resonant oscillation of the idler branch of beam 44. The signal branch denotes the shorter wavelength output from the crystal 24. The mirrors having the spectrum of FIG. 2E had their range of high reflectivity near the degenerate point, and caused doubly resonant oscillation by reflecting both the signal and the idler branches over a narrow wavelength range. These mirrors each have a relatively narrow band of reflection and were used for testing the present invention. However, broadband reflectors specifically designed for the range of wavelengths of interest with the present oscillator will permit the use of fewer pairs of the mirrors 14 and 16, and it is anticipated that by careful design one or two pairs of mirrors will provide oscillation in the cavity 12 over the entire tunable wavelength range of the OPO.

The spacing between the two faces 18 and 20 of mirrors 14 and 16, and thus the length of cavity 12, was 55 mm in the test of the present invention. This length corresponds to an optical cavity length of 75 mm and about 20 round trip passes through the crystal 24 per pulse during operation of the oscillator.

In the course of the foregoing test of the present invention, it was found that the onset of high reflectivity of the pump steering mirrors (FIG. 2A) prevented good oscillation in the region 0.305-0.330 micrometers when resonating the signal branch with the cavity mirrors of FIG. 2B. However, this part of the spectrum was readily obtained by resonating the idler branch with mirrors which reflected wavelengths in the range 1.4-2.0 micrometers, and which transmitted in the ultraviolet to allow extraction of the signal branch as a part of the output beam 46.

Figure 3:
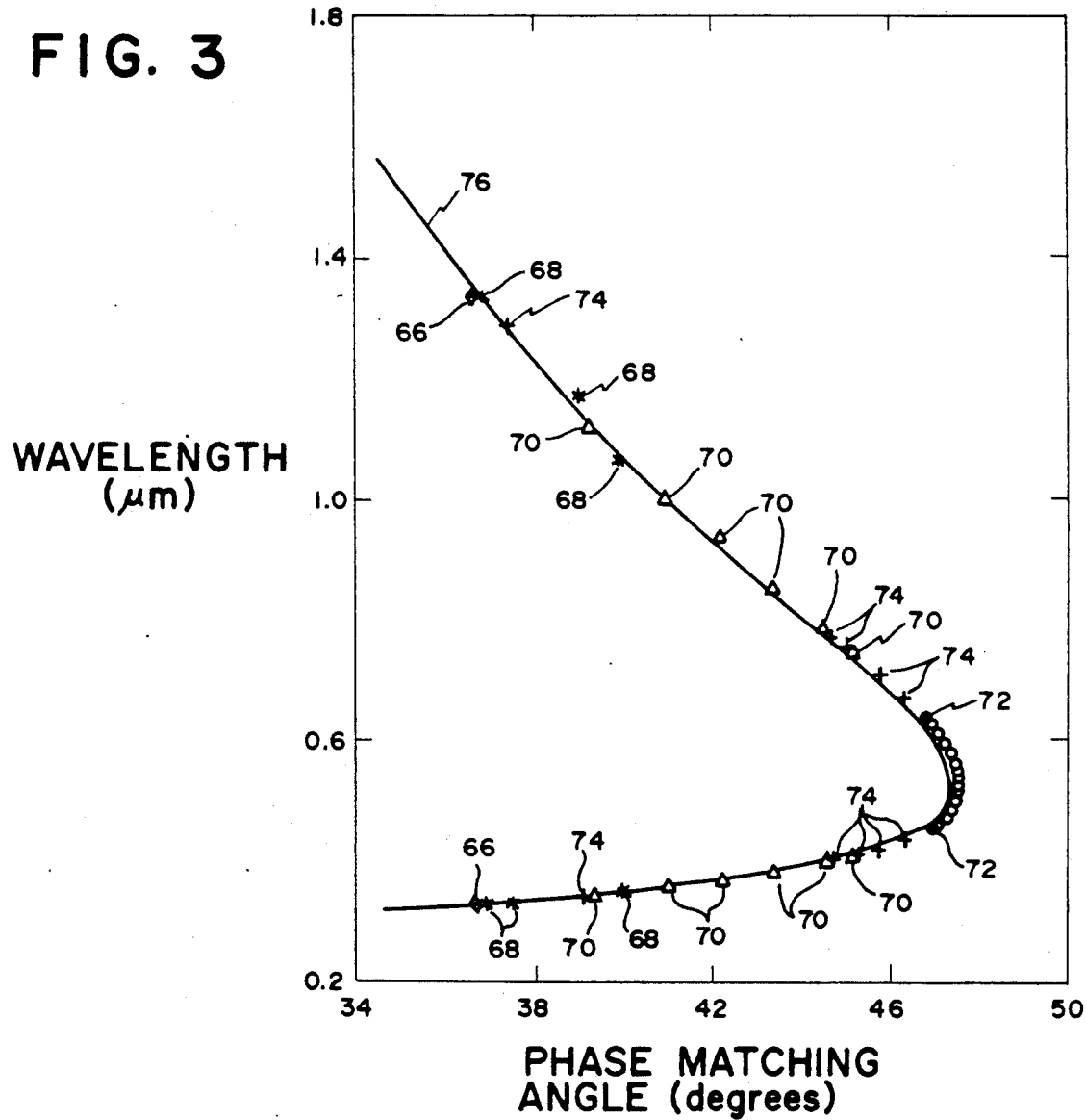
FIG. 3 is a graph illustrating the tuning curve of a beta barium metaborate optical parametric oscillator pumped at 266 nm.

The tuning curve of the OPO 10 was measured by operating the device with the crystal 24 attached to a calibrated rotation mount for rotation about axis 26. The wavelengths of the OPO outputs 46 were measured with a 0.2 m double monochromator as the crystal was rotated and as various cavity mirrors were used. The angle between the crystal face 36 normal and the internal optic axis of the crystal was calibrated. The measured tuning curve for the type I, 266 nm pumped $\beta$-BaB$_2$O$_4$ OPO is shown in FIG. 3 along with the theoretical curve calculated from published Sellmeier equations. The output wavelengths obtained using the cavity resonator mirrors of FIG. 2B are indicated by diamonds 66; the outputs produced by the cavity resonator mirrors of FIG. 2C are indicated by asterisks 68; the outputs produced by cavity resonator mirrors 2D are indicated by triangles 70; the outputs produced by cavity resonator mirrors 2E are indicated by circles 72; and the outputs produced by cavity resonator mirrors 2F are indicated by crosses 74. The solid line 76 is the theoretical curve. Wavelengths of 0.33-1.37 micrometers were produced over the internal angular range of 36.5°-47.5°, requiring an external angular rotation about axis 26 of 18.5°.

The oscillation threshold in the test device was measured to be about 4.5 mJ/pulse, which corresponds to an intensity of about 23 Mw/cm$^2$. The threshold energy per unit area is inversely related to the square of the beam diameter where the effective crystal length is limited by walkoff. This implies that the threshold energy per pulse does not depend on beam size. This was experimentally verified with a 0.8 mm diameter beam and the oscillation energy threshold was again found to be 4.5 mJ/pulse, though the intensity was four times higher. Since the observed optical damage threshold of the mirrors depends on intensity rather than energy, the beam diameter must be increased until the effective walkoff length is equal to the full length of the crystal to obtain maximum efficiency. The efficiency of the device was limited by optical damage to the pump optics and by the conversion efficiency of the 266 nm radiation into the far field. The surface damage threshold of the crystal 24 at 266 nm was found to be at least as high as 120 Mw/cm$^2$. At no time during the experimental tests of the present invention did the crystal 24 exhibit any signs of damage, even after long periods of irradiation at this intensity.

Thus, there has been provided a novel and unique optical parametric oscillator in which continuously tunable output signals in the wavelength range 0.300 to 0.400 range are easily obtained. The oscillator cavity has two separate pairs of mirrors, thus simplifying the coatings required, and allowing the use of commercially available highly reflective mirrors in the cavity and simple aluminized plate glass mirrors as the cavity mirrors. Although the inclusion of a pair of pump steering mirrors lengthens the cavity and thereby increases the oscillation threshold, this design provides a good compromise in view of the limitations imposed in current oscillators by the optical damage caused in current mirror coatings. Although the invention is described in terms of the use of a beta barium metaborate crystal, it should be understood that other crystals might also be used, although the BBO crystal illustrates the advantages of the present cavity construction, which serves to separate the pump signal out of the cavity. Accordingly, the true spirit and scope of the invention is limited only the following claims.

What is claimed is:

1. A singly resonant tunable optical parametric oscillator comprising:
    an oscillator resonant cavity;
    first and second resonant cavity mirrors defining opposite ends of said cavity, said cavity having an optical axis extending between said mirrors;
    a nonlinear optical crystal mounted for rotation in said cavity between said resonant cavity mirrors and lying on said axis, said optical crystal being rotatable about a crystalline axis perpendicular to said cavity axis for tuning said oscillator;

first and second pump steering mirrors in said cavity, said first pump steering mirror being positioned on said cavity axis between said first resonant cavity mirror and a first end of said crystal, said second pump steering mirror being positioned on said cavity axis between said second resonant cavity mirror and a second end of said crystal;

a laser pumping source directing a pump beam of pulses into said cavity, said pump beam being incident on said first pump steering mirror and being deflected thereby into and through said crystal to said second pump steering mirror, said second pump steering mirror directing said pump beam out of said cavity, said pump beam having a wavelength and power sufficient to produce parametric luminescence in said crystal which is emitted therefrom as parametrically generated signal and idler output beams of light having wavelengths dependent upon the rotational position of said crystal with respect to said optical axis; and wherein said resonant cavity mirrors each have a transmittance spectrum which produces substantial reflectance and some transmittance at the wavelengths of a selected one of said parametrically generated output beams to produce singly resonant oscillation in said cavity and to permit light having said selected parametrically generated wavelength to be emitted from the cavity.

2. The oscillator of claim 1, wherein said first and second pump steering mirrors are set at Brewster's angle with respect to said cavity axis.

3. The oscillator of claim 1, wherein said first and second pump steering mirrors are reflective at the wavelength of said pump beam and are transmissive at the wavelengths of said output beams.

4. The oscillator of claim 1, wherein said pump steering mirrors are aligned on said cavity axis and are set at Brewster's angle with respect thereto, said pump steering mirrors each having a transmittance spectrum which produces reflection in a band which includes the wavelength of said pumping beam and transmission in a band which includes the wavelengths of said parametrically generated output beam.

5. The oscillator of claim 4, wherein said crystal is beta barium metaborate.

6. The oscillator of claim 5, wherein said laser pump beam includes pulses having a wavelength of 266 nm.

7. The oscillator of claim 4, wherein said resonant cavity mirrors are coated to produce reflectance and transmittance characteristics which satisfy the conditions for singly resonant oscillation of said signal beam in said cavity.

8. The oscillator of claim 4, wherein said resonant cavity mirrors are coated to produce reflectance and transmittance characteristics which satisfy the conditions for singly resonant oscillation of said idler beam in said cavity.

9. The oscillator of claim 6 wherein said crystal is rotatable to vary the wavelength of said output signal beam of light in the range of about 0.300 to 0.400 micrometer to provide a continuously tunable output.

10. The oscillator of claim 1, wherein said resonant cavity mirrors are coated to produce reflectance and transmittance characteristics which satisfy the conditions for singly resonant oscillation in said cavity at wavelengths selected by rotation of said crystal.

11. The oscillator of claim 10, wherein said first and second pump steering mirrors are set at Brewster's angle with respect to said cavity axis.

12. The oscillator of claim 10, wherein said first and second pump steering mirrors are reflective at the wavelength of said laser pump beam, and are transmissive at the wavelength of said output beam of light.

13. The oscillator of claim 12, wherein said output beam of light has a wavelength tunable in the ultraviolet, visible, or near infrared wavelengths.

14. The oscillator of claim 13, wherein said pump beam has a wavelength of 266 nm, and wherein said output beam has a wavelength selectable between about 0.300 to 0.400 micrometers.

15. The oscillator of claim 14, wherein said crystal is beta barium metaborate.

* * * * *